(12) United States Patent
Chuang et al.

(10) Patent No.: US 11,764,592 B2
(45) Date of Patent: Sep. 19, 2023

(54) CHARGING DEVICE

(71) Applicant: PEGATRON CORPORATION, Taipei (TW)

(72) Inventors: Hsin-Lin Chuang, Taipei (TW); Wen-Chang Chuang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 196 days.

(21) Appl. No.: 17/376,008

(22) Filed: Jul. 14, 2021

(65) Prior Publication Data
US 2022/0069594 A1 Mar. 3, 2022

(30) Foreign Application Priority Data
Aug. 26, 2020 (TW) .................................. 109129080

(51) Int. Cl.
*H02J 7/00* (2006.01)
(52) U.S. Cl.
CPC .................................. *H02J 7/0042* (2013.01)
(58) Field of Classification Search
CPC ....................................................... H02J 7/00
See application file for complete search history.

(56) References Cited

U.S. PATENT DOCUMENTS

2020/0205630 A1\* 7/2020 Mai ...................... H02J 7/0044

FOREIGN PATENT DOCUMENTS

| CN | 103910017 | 8/2016 |
|---|---|---|
| CN | 211045891 | 7/2020 |
| TW | M381533 | 6/2010 |
| TW | 201026278 | 7/2010 |
| TW | M503233 | 6/2015 |
| TW | M589577 | 1/2020 |

\* cited by examiner

*Primary Examiner* — Robert Grant
(74) *Attorney, Agent, or Firm* — J.C. PATENTS (57) ABSTRACT

A charging device adapted to charge a mobile device includes a fixing base, a charging arm and a restoring member. The charging arm has a first arm end and a second arm end opposite to each other. The first arm end is pivotally connected to the fixing base. During a process of the mobile device docking with the second arm end of the charging arm, the charging arm is adapted to pivotally rotate relative to the fixing base to a docked position corresponding to the mobile device. The restoring member extends along a central axis and is connected to the fixing base and the charging arm. The restoring member provides an elastic potential energy to the charging arm, such that when the mobile device moves away from the charging device, the charging arm is moved from the docked position to an original position by the elastic potential energy.

9 Claims, 7 Drawing Sheets

CHARGING DEVICE

CROSS-REFERENCE TO RELATED APPLICATION

This application claims the priority benefit of Taiwanese application no. 109129080, filed on Aug. 26, 2020. The entirety of the above-mentioned patent application is hereby incorporated by reference herein and made a part of this specification.

BACKGROUND

Technical Field

This disclosure relates to a charging device; in particular, the disclosure relates to a charging device capable of charging a mobile device.

Description of Related Art

Currently, for charging a mobile device (e.g., a robot), the mobile device is to be docked with a charging device. Since slight deviation may be present during the alignment between the mobile device and the charging device, if an angle of a charging terminal of the charging device can be adjusted correspondingly, docking with the mobile device would be facilitated. How to restore the charging terminal of the charging device to an original position after the mobile device moves away is an issue to be studied in the art.

SUMMARY

The disclosure provides a charging device, of which a charging arm rotates relative to a fixing base to adjust an angle thereof, and is restored to an original position when a mobile device moves away from the charging device.

In the disclosure, a charging device is adapted to charge a mobile device. The charging device includes a fixing base, a charging arm, and a restoring member. The charging arm has a first arm end and a second arm end opposite to each other. The first arm end is pivotally connected to the fixing base. During a process of the mobile device docking with the second arm end of the charging arm, the charging arm is adapted to pivotally rotate relative to the fixing base to a docked position corresponding to the mobile device. The restoring member extends along a central axis and is connected to the fixing base and the charging arm. The restoring member provides an elastic potential energy to the charging arm, such that when the mobile device moves away from the charging device, the charging arm is moved from the docked position to an original position by the elastic potential energy.

In an embodiment of this disclosure, the restoring member includes an elastic metal rod.

In an embodiment of this disclosure, the fixing base includes a top surface and a bottom surface opposite to each other. The charging arm is disposed on the top surface. The restoring member is disposed on the bottom surface. The fixing base has a hole. The restoring member is connected to a portion of the charging arm exposed from the hole to limit a margin of the charging arm pivotally rotating relative to the fixing base.

In an embodiment of this disclosure, the charging arm includes a threaded base passing through the hole of the fixing base. An inner diameter of the hole is greater than an outer diameter of the threaded base. The threaded base is adapted to move in the hole, such that the charging arm pivotally rotates relative to the fixing base. In addition, a wall surface of the hole limits a movement range of the threaded base and limits a pivotal rotation range of the charging arm relative to the fixing base.

In an embodiment of this disclosure, the fixing base includes a groove extending along the central axis, and the restoring member is partially located in the groove.

In an embodiment of this disclosure, the restoring member includes a first rod end and a second rod end opposite to each other. The first rod end is connected to the fixing base. The second rod end is connected to the charging arm.

In an embodiment of this disclosure, the fixing base includes a groove extending along the central axis and a fixing portion located at an end of the groove. The first rod end of the restoring member is inserted into the fixing portion to be positioned on the fixing base.

In an embodiment of this disclosure, the charging device further includes a locking member. The fixing base has a hole. The charging arm includes a threaded base passing through the hole of the fixing base. The second rod end is sleeved on the threaded base. The locking member presses the second rod end and is fixed on the threaded base. The second rod end is clamped by the locking member and the threaded base.

In an embodiment of this disclosure, the fixing base further includes an elastic deformation portion located beside an outer side of the first arm end. The first arm end includes an ear portion corresponding to the elastic deformation portion, and the ear portion is engaged with the elastic deformation portion. When the charging arm rotates relative to the fixing base, the ear portion compresses the elastic deformation portion to generate an elastic force. When the mobile device is separated from the charging device, the elastic force is released, and the elastic deformation portion pushes against the ear portion to restore the charging arm.

In an embodiment of this disclosure, the charging arm includes two opposite side walls located at the second arm end and two electrical connection portions located on the two side walls. The two electrical connection portions are adapted to be electrically connected to the mobile device.

Based on the foregoing, in the disclosure, the charging arm of the charging device is pivotally connected to the fixing base through the first arm end, and is adapted to pivotally rotate relative to the fixing base to the docked position corresponding to the mobile device. Besides, the restoring member of the charging device is connected to the fixing base and the charging arm. When the charging arm rotates, the restoring member will be deformed. Since the restoring member normally extends along the central axis, when the mobile device moves away, the restoring member is effectively restored to the central axis. Therefore, when the mobile device moves away the charging device, the charging arm is pulled back by the restoring member and is restored to the original position extending along the central axis relative to the fixing base.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
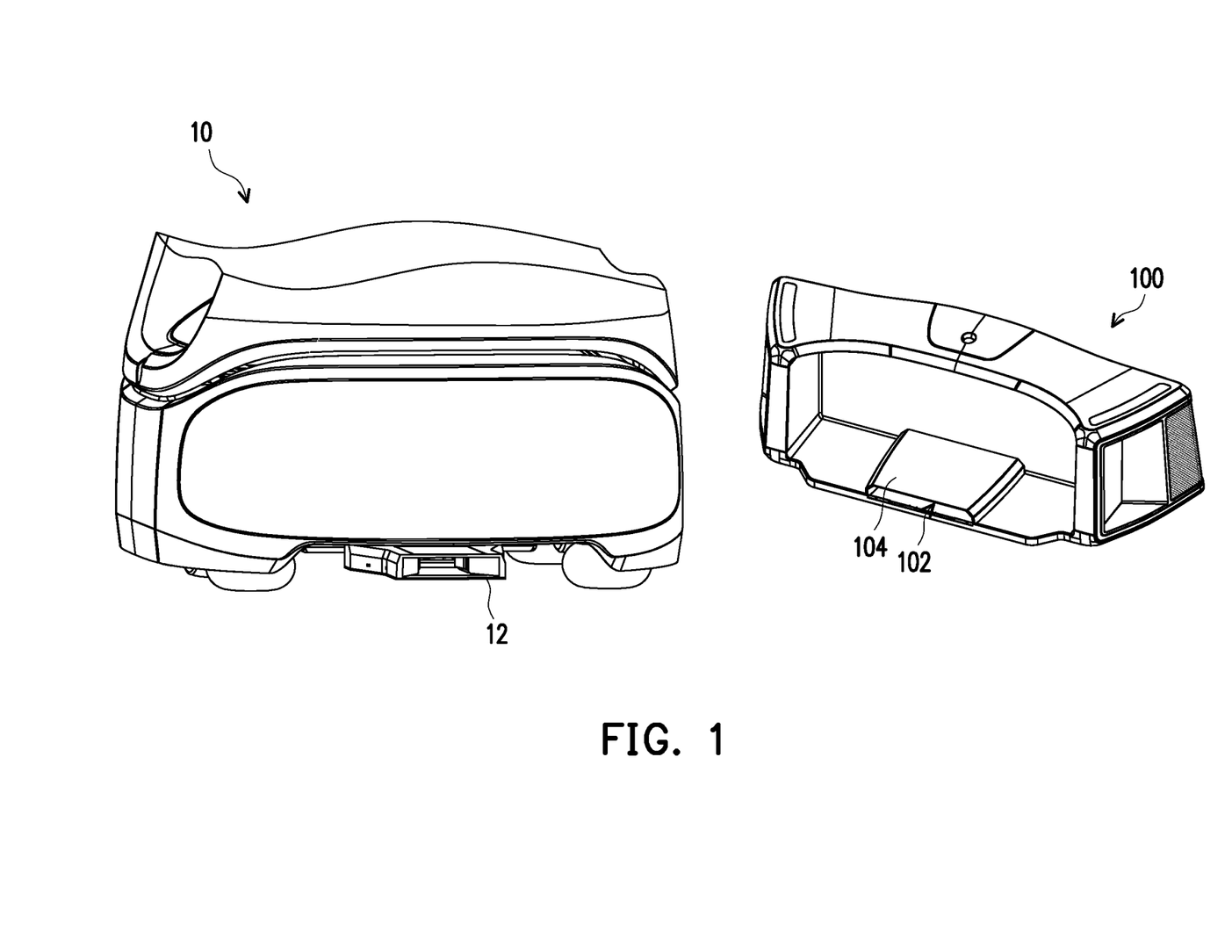
FIG. 1 is a schematic diagram of a charging device and a mobile device according to an embodiment of the disclosure.
Figure 2:
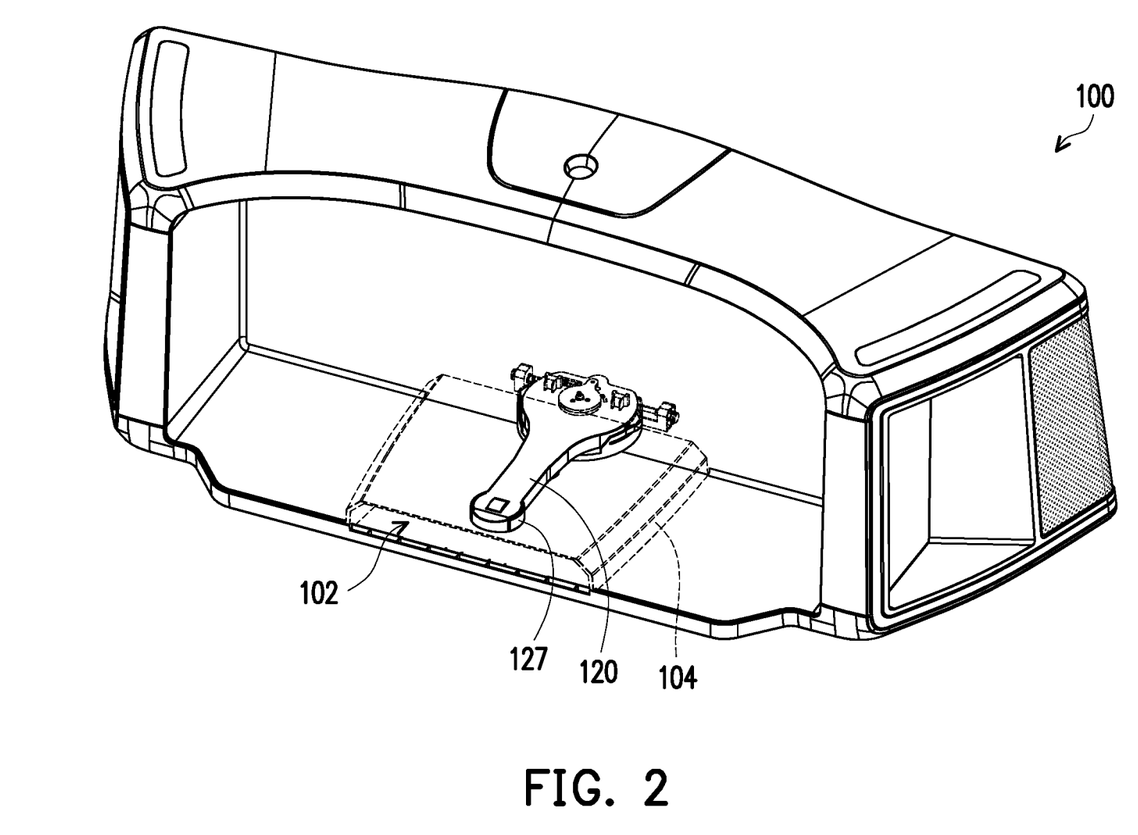
FIG. 2 is an enlarged schematic diagram of the charging device of FIG. 1.

FIG. 1 is a schematic diagram of a charging device and a mobile device according to an embodiment of the disclosure. FIG. 2 is an enlarged schematic diagram of the charging device of FIG. 1. It should be noted that since a mobile device 10 is of a relatively great height, in order to show a charging device 100 and the mobile device 10 at the same time and to clearly show the appearance of the charging device 100, only part of the mobile device 10 is shown in FIG. 1. Besides, in order to clearly show a charging arm 120 inside the charging device 100, a cover 104 in FIG. 2 is presented with dashed lines.

With reference to FIG. 1 and FIG. 2, a mobile device 10 includes an electrical connector 12, which may be inserted into an insertion port 102 of a charging device 100 to be docked with the charging device 100 for charging. The mobile device 10 is, for example, a walking robot that may be configured to talk with a user or display a screen for the user to watch, a cargo-carrying robot, a robotic vacuum cleaner, or the like, but the type of the mobile device 10 is not limited thereto.

Figure 3:
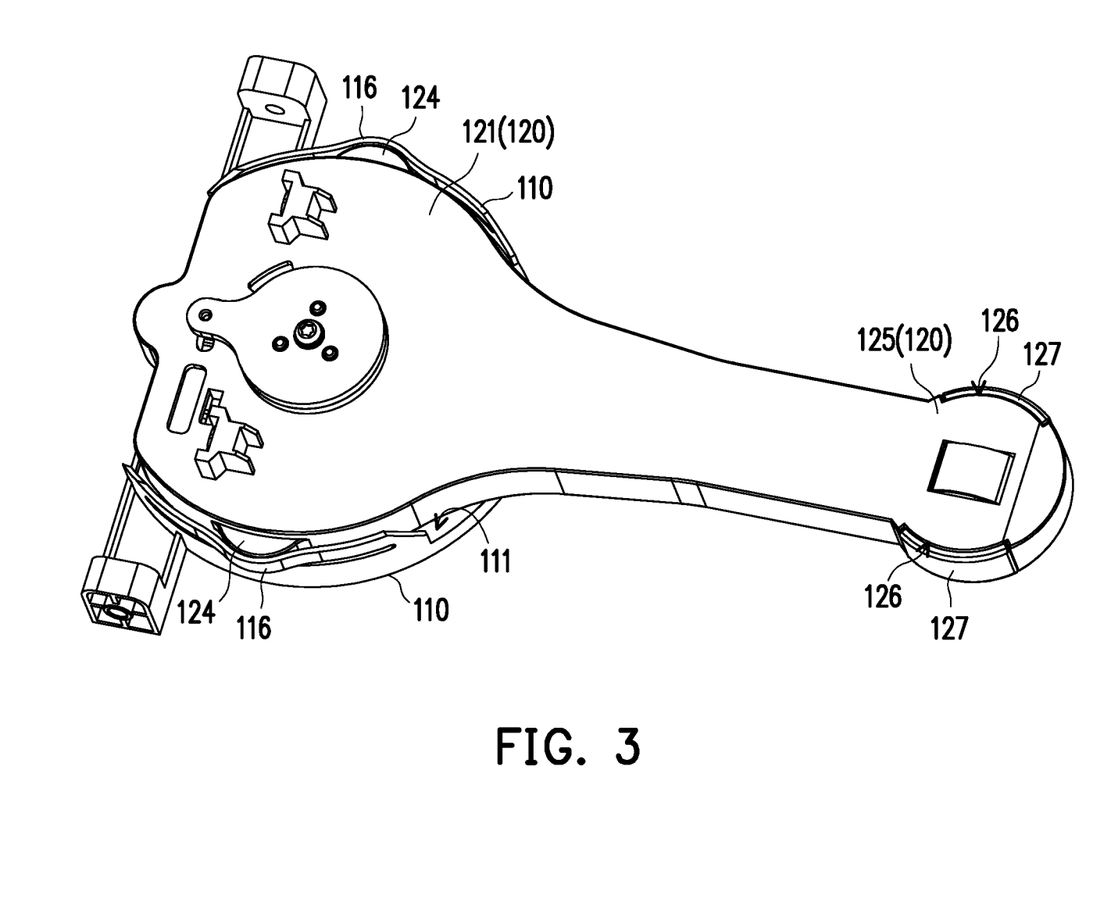
FIG. 3 is an enlarged schematic diagram of a fixing base and a charging arm of the charging device of FIG. 1.
Figure 4:
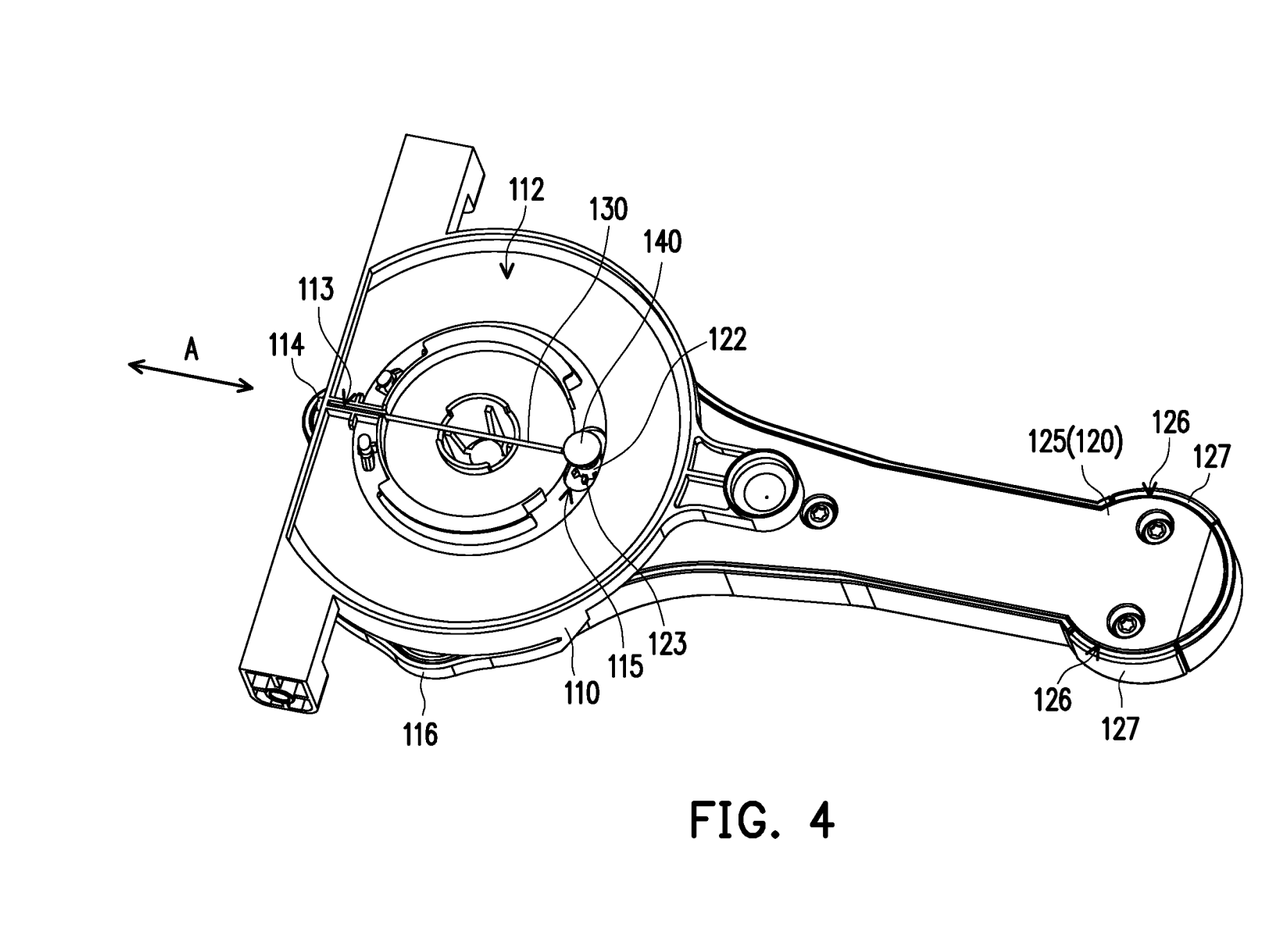
FIG. 4 is a schematic diagram of the elements of FIG. 3 from a rear side.
Figure 5:
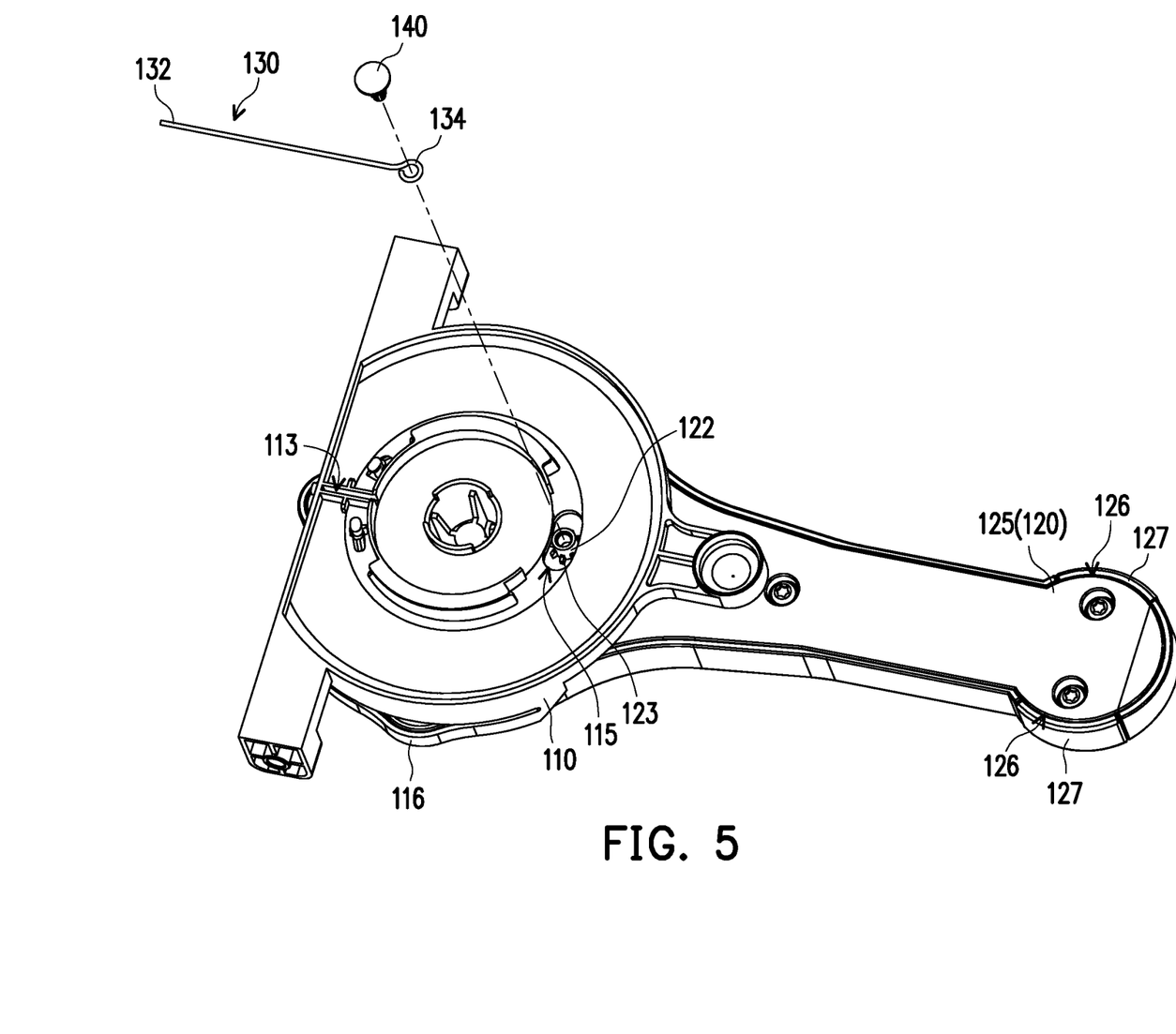
FIG. 5 is a schematic diagram of a restoring member of FIG. 4 before being assembled.

FIG. 3 is an enlarged schematic diagram of a fixing base and a charging arm of the charging device of FIG. 1. FIG. 4 is a schematic diagram of the elements of FIG. 3 from a rear side. FIG. 5 is a schematic diagram of a restoring member of FIG. 4 before being assembled. With reference to FIG. 3 to FIG. 5, the charging device 100 includes a fixing base 110, a charging arm 120, and a restoring member 130 (FIG. 4).

As shown in FIG. 3, the charging arm 120 is disposed on a top surface 111 of the fixing base 110. The charging arm 120 has a first arm end 121 and a second arm end 125 opposite to each other. The first arm end 121 is pivotally connected to the fixing base 110 and rotates relative to the fixing base 110. Therefore, during a process of the mobile device 10 (FIG. 1) docking with the charging device 100, the charging arm 120 is rotatable, facilitating the docking with the mobile device 10.

The charging arm 120 includes two opposite side walls 126 located at the second arm end 125 and two electrical connection portions 127 located on the two side walls 126. When the mobile device 10 (FIG. 1) is docked with the charging device 100, the two electrical connection portions 127 of the charging device 100 are adapted to be in contact with the electrical connector 12 of the mobile device 10 to charge the mobile device 10.

As shown in FIG. 4, the restoring member 130 extends along a central axis A and is connected to the fixing base 110 and the charging arm 120. In this embodiment, the restoring member 130 includes an elastic metal rod, in which the restoring member 130 is in a shape of a long rod, and is slightly flexible. Besides, since the material of the restoring member 130 is metal material, the restoring member 130 has a certain degree of rigidity, such that the restoring member 130 will be restored to an original state after a force exerted thereon disappears.

In an embodiment, the restoring member 130 may be a plastic member. In an embodiment, the restoring member 130 may also be a non-straight rod, such as a rod with a curvature or in a wavy shape, and extends substantially along the central axis A. Alternative, the restoring member 130 may also be composed of multiple rods, for example, two arc-shaped rods in an eye-like shape of which heads and tails are connected with each other and two middle sections protrude away from each other, and extends substantially along the central axis A. Naturally, the material and shape of the restoring member 130 are not limited thereto.

Besides, as shown in FIG. 4 and FIG. 5, in this embodiment, the restoring member 130 is disposed on a bottom surface 112 of the fixing base 110. Specifically, the fixing base 110 includes a groove 113 located on the bottom surface 112 and extending along the central axis A. The restoring member 130 includes a first rod end 132 (FIG. 5) and a second rod end 134 (FIG. 5) opposite to each other. A portion of the restoring member 130 that is close to the first rod end 132 is located in the groove 113. In addition, the first rod end 132 is connected to the fixing base 110.

In this embodiment, the fixing base 110 includes a fixing portion 114 located at an end of the groove 113. The fixing portion 114 includes, for example, a concave hole. The first rod end 132 of the restoring member 130 is inserted into the fixing portion 114 to be positioned on the fixing base 110.

Besides, the second rod end 134 of the restoring member 130 is connected to the charging arm 120. In this embodiment, the fixing base 110 has a hole 115, and the second rod end 134 of the restoring member 130 is connected to a portion of the charging arm 120 exposed from the hole 115. The hole 115 is in a long shape, such as a rectangular shape or a long arc shape. At least one of the portion of the charging arm 120 exposed from the hole 115 and the second rod end 134 of the restoring member 130 is adapted to move in the hole 115.

Specifically, as shown in FIG. 4 and FIG. 5, the charging arm 120 includes a threaded base 122 and at least one structural reinforcement portion 123, in which the threaded base 122 protrudes in a direction toward the fixing base 110 and passing through the hole 115 of the fixing base 110 and the at least one structural reinforcement portion 123 located on an outer side of the threaded base 122. The threaded base 122 and the structural reinforcement portion 123 of the charging arm 120 are exposed from the hole 115 of the fixing base 110. In this embodiment, the structural reinforcement portion 123 includes multiple structural reinforcement portions, which are arranged around the threaded base 122.

In this embodiment, when the charging arm 120 rotates relative to the fixing base 110, the threaded base 122 of the charging arm 120 correspondingly moves in the hole 115. A length of the hole 115 limits a rotation range of the charging arm 120 relative to the fixing base 110.

In this embodiment, an inner diameter of the hole 115 is greater than an outer diameter of the threaded base 122. The threaded base 122 is adapted to move in the hole 115, such that the charging arm 120 pivotally rotates relative to the fixing base 110. In addition, a wall surface of the hole 115 limits a movement range of the threaded base 122 and limits a pivotal rotation range of the charging arm 120 relative to the fixing base 110. The second rod end 134 of the restoring member 130 is wound into an annular shape, and the second rod end 134 is sleeved on the threaded base 122. A locking member 140 presses the second rod end 134 of the restoring member 130 and is fixed on the threaded base 122, such that the second rod end 134 of the restoring member 130 is clamped and fixed by the locking member 140 and the structural reinforcement portion 123 of the charging arm 120. The locking member 140 is, for example, a screw, but it is not limited thereto. The structural reinforcement portion 123 may be configured to reinforce the threaded base 122, such that the threaded base 122 is not likely to crack when compressed by the locking member 140. Besides, the restoring member 130 is connected to the portion (the threaded base 122) of the charging arm 120 exposed from the hole 115 to limit a margin of the charging arm 120 pivotally rotating relative to the fixing base 110.

Figure 6:
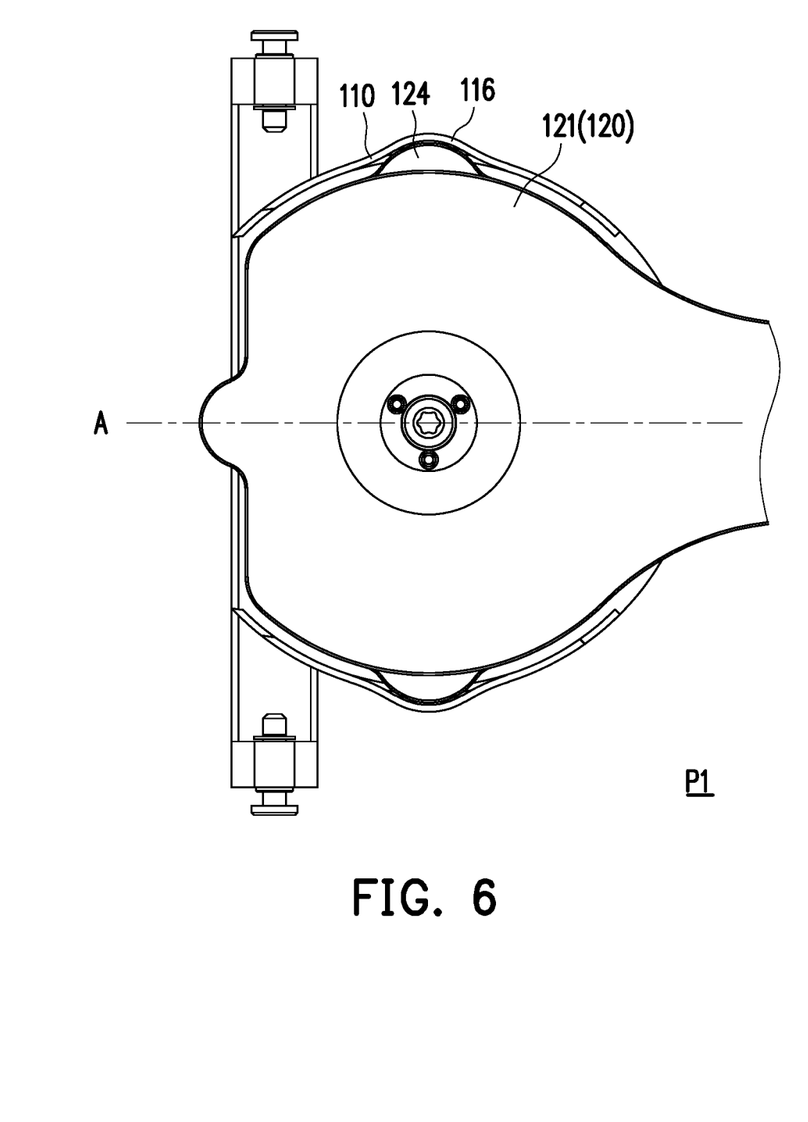
FIG. 6 is a schematic diagram of the charging arm of the charging device of FIG. 1 in an original position.

FIG. 6 is a schematic diagram of the charging arm of the charging device of FIG. 1 in an original position. It should be noted that FIG. 6 and FIG. 4 respectively show the front side and the rear side of the charging arm 120, and FIG. 6 only shows part of the charging arm 120.

With reference to FIG. 4 and FIG. 6 together, in this embodiment, the restoring member 130 (FIG. 4) extends along the central axis A, or, if the restoring member 130 is not a straight rod, the restoring member 130 substantially extends along the central axis A, and the restoring member 130 of the charging device 100 is connected to the fixing base 110 and the charging arm 120. Therefore, the charging arm 120 is normally located in an original position P1 (FIG. 6, the central position) extending along the central axis A relative to the fixing base 110.

Figure 7:
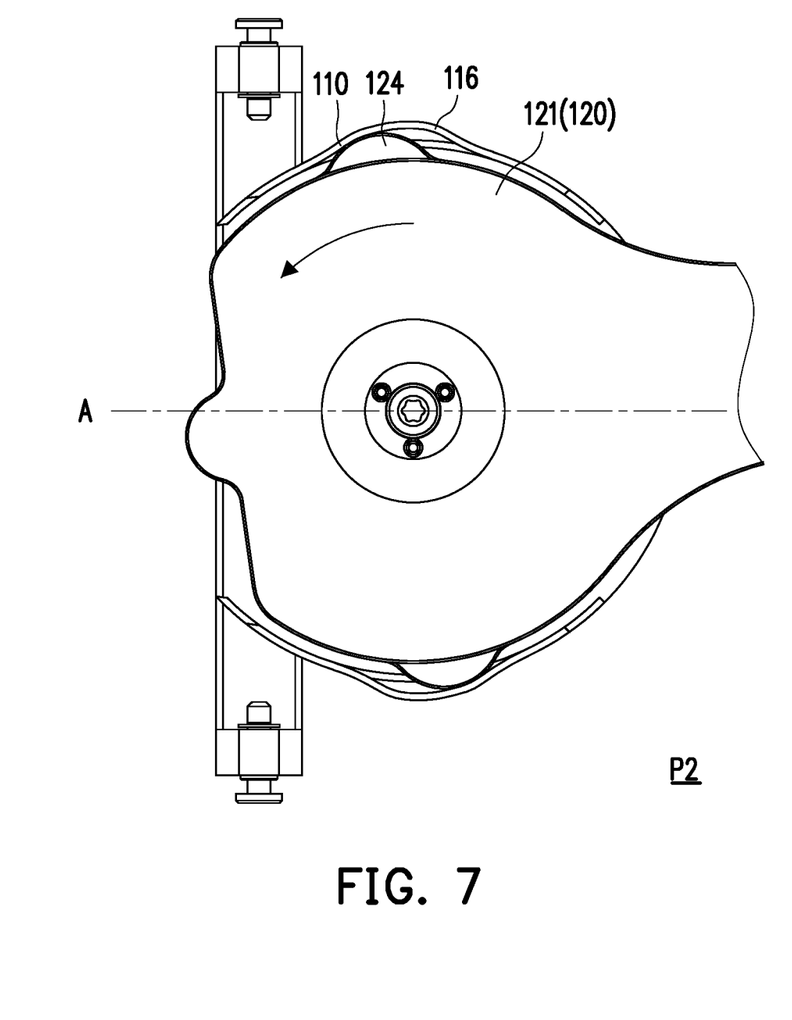
FIG. 7 is a schematic diagram of the charging arm of the charging device of FIG. 1 being rotated to a docked position.

FIG. 7 is a schematic diagram of the charging arm of the charging device of FIG. 1 being rotated to a docked position. With reference to FIG. 7, during the process of the mobile device 10 (FIG. 1) docking with the second arm end 125 (FIG. 3) of the charging arm 120, the first arm end 121 of the charging arm 120 pivotally rotates relative to the fixing base 110 to a docked position P2 corresponding to the mobile device 10 to increase the efficiency in docking between the first arm end 121 of the charging arm 120 and the mobile device 10.

At this time, the restoring member 130 (FIG. 4) is slightly flexed and an elastic potential energy is accumulated thereby. When the mobile device 10 moves away from the charging device 100, the restoring member 130 is restored to the original state as the elastic potential energy is released, and the first arm end 121 of the charging arm 120 is pulled back. The charging arm 120 is pulled back by the restoring member 130 and is restored to the original position P1 extending along the central axis A (FIG. 6) relative to the fixing base 110.

Conventionally, torsion springs or similar elements are commonly utilized to bring elements back to their original positions. However, it is likely that the torsion springs under long-term use are unable to return to the position due to tolerances and other factors. Compared to the torsion spring wound into multiple circles, the restoring member 130 of the embodiment extends along the central axis A, and can be restored to the original position more stably through the structure and shape design thereof. Besides, since the fixing base 110 is provided with the groove 113 extending along the central axis A, the restoring member 130 may be fixed in the groove 113 and maintained on the central axis A.

In addition, referring back to FIG. 6, in this embodiment, the fixing base 110 further includes at least one elastic deformation portion 116 located at an outer side of the first arm end 121, the first arm end 121 includes at least one ear portion 124 corresponding to the elastic deformation portion 116, and the ear portion 124 is engaged with the elastic deformation portion 116. In this embodiment, a quantity of the elastic deformation portion 116 shown is two, and a quantity of the ear portion 124 shown is two, but in other embodiments, the quantity of the elastic deformation portions 116 only requires to correspond to the quantity of the ear portion 124, and they are not limited to the above.

As shown in FIG. 7, when the charging arm 120 rotates relative to the fixing base 110, the ear portion 124 of the first arm end 121 compresses the elastic deformation portion 116 of the fixing base 110 to deform the elastic deformation portion 116. At this time, the deformed elastic deformation portion 116 generates an elastic force. When the mobile device 10 is separated from the charging device 100, the elastic force of the elastic deformation portion 116 is released, and the elastic deformation portion 116 is restored to an original state thereof. During this process, the elastic deformation portion 116 pushes against the ear portion 124 to restore the charging arm 120.

That is to say, in this embodiment, the charging arm 120 may be restored not only by the restoring member 130 to the original position P1 extending along the central axis A, but also by the elastic deformation portion 116 of the fixing base 110. The above design ensures that the charging arm 120 returns to the original position P1. In some other embodiments, the charging device 100 may include one of the restoring member 130 and the elastic deformation portion 116 for the charging arm 120 to return to the original position P1.

In summary of the foregoing, in the disclosure, the charging arm of the charging device is pivotally connected to the fixing base through the first arm end, and is adapted to pivotally rotate relative to the fixing base to the docked position corresponding to the mobile device. Besides, the restoring member of the charging device is connected to the fixing base and the charging arm. When the charging arm rotates, the restoring member will be deformed. Since the restoring member normally extends along the central axis, when the mobile device moves away, the restoring member is effectively restored to the central axis. Therefore, when the mobile device moves away the charging device, the charging arm is pulled back by the restoring member and is restored to the original position extending along the central axis relative to the fixing base.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A charging device, adapted to charge a mobile device, wherein the charging device comprises:
   a fixing base;
   a charging arm having a first arm end and a second arm end opposite to each other, wherein the first arm end is pivotally connected to the fixing base, and during a process of the mobile device docking with the second arm end of the charging arm, the charging arm is adapted to pivotally rotate relative to the fixing base to a docked position corresponding to the mobile device; and a restoring member extending along a central axis and connected to the fixing base and the charging arm, wherein the restoring member provides an elastic potential energy to the charging arm, such that when the mobile device moves away from the charging device, the charging arm is moved from the docked position to an original position by the elastic potential energy, wherein the restoring member comprises an elastic straight metal rod.

2. The charging device according to claim 1, wherein the fixing base comprises a top surface and a bottom surface opposite to each other, the charging arm is disposed on the top surface, the restoring member is disposed on the bottom surface, the fixing base has a hole, and the restoring member is connected to a portion of the charging arm exposed from the hole to limit a margin of the charging arm pivotally rotating relative to the fixing base.

3. The charging device according to claim 2, wherein the charging arm comprises a threaded base passing through the hole of the fixing base, an inner diameter of the hole is greater than an outer diameter of the threaded base, the threaded base is adapted to move in the hole, such that the charging arm pivotally rotates relative to the fixing base, and a wall surface of the hole limits a movement range of the threaded base and limits a pivotal rotation range of the charging arm relative to the fixing base.

4. The charging device according to claim 1, wherein the fixing base comprises a groove extending along the central axis, and the restoring member is partially located in the groove.

5. The charging device according to claim 1, wherein the restoring member comprises a first rod end and a second rod end opposite to each other, the first rod end is connected to the fixing base, and the second rod end is connected to the charging arm.

6. The charging device according to claim 5, wherein the fixing base comprises a groove extending along the central axis and a fixing portion located at an end of the groove, and the first rod end of the restoring member is inserted into the fixing portion to be positioned on the fixing base.

7. The charging device according to claim 5, further comprising a locking member, wherein the fixing base has a hole, the charging arm comprises a threaded base passing through the hole of the fixing base, the second rod end is sleeved on the threaded base, the locking member presses the second rod end and is fixed on the threaded base, and the second rod end is clamped by the locking member and the threaded base.

8. The charging device according to claim 1, wherein the fixing base further comprises an elastic deformation portion located at an outer side of the first arm end, the first arm end comprises an ear portion corresponding to the elastic deformation portion, and the ear portion is engaged with the elastic deformation portion, wherein when the charging arm rotates relative to the fixing base, the ear portion compresses the elastic deformation portion to generate an elastic force, and when the mobile device is separated from the charging device, the elastic force is released, and the elastic deformation portion pushes against the ear portion to restore the charging arm.

9. The charging device according to claim 1, wherein the charging arm comprises two opposite side walls located at the second arm end and two electrical connection portions located on the two side walls, and the two electrical connection portions are adapted to be electrically connected to the mobile device.

* * * * *